United States Patent
Yamada et al.

(10) Patent No.: US 6,265,891 B1
(45) Date of Patent: Jul. 24, 2001

(54) APPARATUS FOR DETECTING A COIL SHORT CIRCUIT IN AN ELECTRIC MOTOR

(75) Inventors: Daisuke Yamada; Keiichi Yamamoto; Masanori Sugiyama; Hiroyuki Matsubara; Chiaki Honma, all of Aichi-ken (JP)

(73) Assignee: Aisin Seiki Kabushiki Kaisha, Aichi-ken (JP)

(*) Notice: Subject to any disclaimer, the term of this patent is extended or adjusted under 35 U.S.C. 154(b) by 0 days.

(21) Appl. No.: 09/329,195

(22) Filed: Jun. 10, 1999

(30) Foreign Application Priority Data

Jun. 10, 1998 (JP) .................................................. 10-161248

(51) Int. Cl.[7] .......................... G01R 31/34; G01R 31/02; G06F 19/00
(52) U.S. Cl. .......................... 324/772; 324/545; 324/546; 318/490; 318/648; 702/57; 702/58
(58) Field of Search ..................................... 324/772, 545, 324/546; 318/490; 340/648; 702/57, 58

(56) References Cited

U.S. PATENT DOCUMENTS

| | | | |
|---|---|---|---|
| 4,251,758 | * | 2/1981 | Pederson et al. ..................... 318/254 |
| 4,384,244 | * | 5/1983 | Matsumoto .......................... 318/803 |
| 4,542,329 | * | 9/1985 | Tu Xuan ............................. 318/696 |
| 4,743,848 | * | 5/1988 | Krimm et al. ........................ 324/772 |
| 4,896,088 | * | 1/1990 | Jahns ................................... 318/696 |
| 4,896,089 | * | 1/1990 | Kliman et al. ........................ 318/701 |
| 5,111,091 | * | 5/1992 | Bahn ................................... 310/68 B |
| 5,493,214 | * | 2/1996 | Good et al. .......................... 324/173 |
| 5,569,989 | * | 10/1996 | Acquaviva ........................... 318/254 |
| 5,614,798 | | 3/1997 | Zydek et al. . |
| 5,796,226 | | 8/1998 | Ookawa et al. . |
| 5,850,133 | * | 12/1998 | Heglund .............................. 318/700 |

FOREIGN PATENT DOCUMENTS

| | | |
|---|---|---|
| 40 35 067 | 5/1992 | (DE) . |
| 196 39 698 | 4/1997 | (DE) . |
| 10-42586 | 2/1998 | (JP) . |

* cited by examiner

*Primary Examiner*—Glenn W. Brown
*Assistant Examiner*—Wasseem H. Hamdan
(74) *Attorney, Agent, or Firm*—Sughrue, Mion, Zinn, Macpeak & Seas, PLLC

(57) ABSTRACT

For detecting a coil short-circuit in an electric motor such as a switched reluctance motor, an apparatus includes a first phase coil, a second phase coil, and a third phase coil. Through each of the coils, a current, whose amount is sensed by a current sensor, flows in such manner that the amount ranges from zero to a reference current amount in a reference set-up time duration. If the detected amount of current by the current sensor becomes the reference current amount in a time duration which is shorter than the reference set-up time duration and the resultant condition continues for an another reference time duration, it is regarded that a short-circuit occurs in the phase coil corresponding to the current sensor and the apparatus stops the electric motor.

4 Claims, 4 Drawing Sheets

APPARATUS FOR DETECTING A COIL SHORT CIRCUIT IN AN ELECTRIC MOTOR

BACKGROUND OF THE INVENTION

Field of the Invention

The present invention is directed to an apparatus for detecting a short-circuit in a coil of an electric motor such as a switched reluctance motor.

Japanese Patent Laid-open Print No. Hei. 10-42586, which was published on Feb. 13, 1998 without examination, discloses a driving circuit for a brush-less motor. In this driving circuit, upon detection of a continuous excess current flow through a coil for a determined time duration, such a continuation of the excess current flowing is regarded as an abnormal condition which makes the driving circuit stop the motor. Thus, in the event of a short circuit in a coil which causes an excess current flowing through a coil which is similar to the above, the motor is made to stop.

However, the foregoing concept cannot be applied to another type electric motor such as a switched reluctance motor. In detail, particularly, the switched reluctance motor includes a rotor angular position detecting sensor, a plurality of phase coils provided on a stator, a plurality of current sensors which sense the amount of current in the respective phase coils, and an energizing controller. In the energizing controller, on the basis of a target rotational number and the torque of the motor, an energizing initiating rotor angle, a de-energizing terminating rotor angle, and a reference current amount are calculated for each phase coil. When each rotor angular position detected by the corresponding rotor angular position sensor becomes the energizing initiating (energizing terminating) rotor angle position at the corresponding phase coil, the phase coil begins to be energized (de-energized) and between the energizing time point and the de-energizing time point a continual comparison is made between the detected current by the current sensor and the reference current amount for establishing a current supply control wherein if the former is less than the latter or not, the energizing remains unchanged or is stopped, respectively.

In the energizing control in the aforementioned switched reluctance motor, the current to be passed through the phase coil is to be adjusted to the reference current amount, whereby even if a short-circuit occurs in any one of the phase coils, the resultant excess current flowing through the corresponding phase coil is adjusted to the reference current amount and therefore cannot be detected. This means the concept taught by the foregoing Japanese Reference cannot be employed in switched reluctance motors.

SUMMARY OF THE INVENTION

Therefore, in view of the foregoing circumstances, the present invention is intended to provide an apparatus for detecting a short-circuit in a coil of an electric motor such as a switched reluctance motor.

In order to attain the foregoing objects, an apparatus for detecting coil short-circuits in an electric motor is provided which comprises a rotor angular position detecting sensor for detecting an angular position of a rotor, a plurality of phase coils provided on a stator, a plurality of current sensors which sense current amounts in the respective phase coils, an energizing controller calculating an energizing initiating rotor angle, a de-energizing terminating rotor angle, and a reference current amount for each of the phase coils on a basis of the target rotational speed and the torque of the motor, the energizing controller initiating an energization of each of the phase coils when the angular position of the rotor which is detected by the corresponding rotor angular position sensor is found to be in coincidence with the energizing initiating rotor angle, the energizing controller terminating the energization of each of the phase coils when the angular position of the rotor which is detected by the corresponding rotor angular position sensor is found to be in coincidence with the de-energizing initiating rotor angle, the energizing controller making a comparison between the current sensed by each of the current sensors and a reference current during a time duration between the initiation and the termination of the energization of the phase coil, for continuing or interrupting the energization of the phase coil, if the sensed current amount is less or not less, respectively, than the reference current amount, set-up time measuring means for counting a set-up time duration which ranges from a time point at which the sensed current amount is zero to another time point at which the sensed current amount reaches the reference current amount, calculating means for calculating a reference set-up time duration and decision means for deciding whether a short-circuit occurs or not in each of the phase coils based on a comparison between the set-up time duration measured by the set-up time measuring means and the reference set-up time duration.

BRIEF DESCRIPTION OF THE DRAWING

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

A preferred embodiment of the present invention will be described hereinafter in detail with reference to the accompanying drawings.

Figure 1:
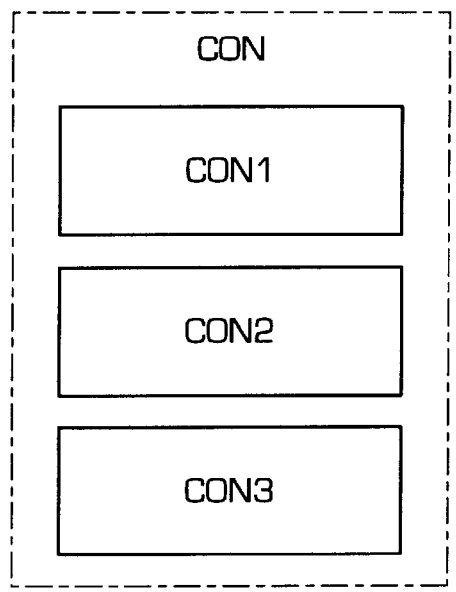
FIG. 1 is a block diagram of an embodiment of an apparatus according to the present invention which is in the form of an energizing control apparatus for a three phase reluctance motor.

FIG. 1 is a block diagram of an energizing control device CON for use with a three-phase switched reluctance motor SRM which is one of the typical electric motors used in electric automotive vehicles. The energizing control device CON includes a first phase energizing division CON1, a second phase energizing division CON2, and a third phase energizing division CON3. These three phase energizing divisions CON1, CON2, and CON3 are of similar structure and operation.

Figure 2:
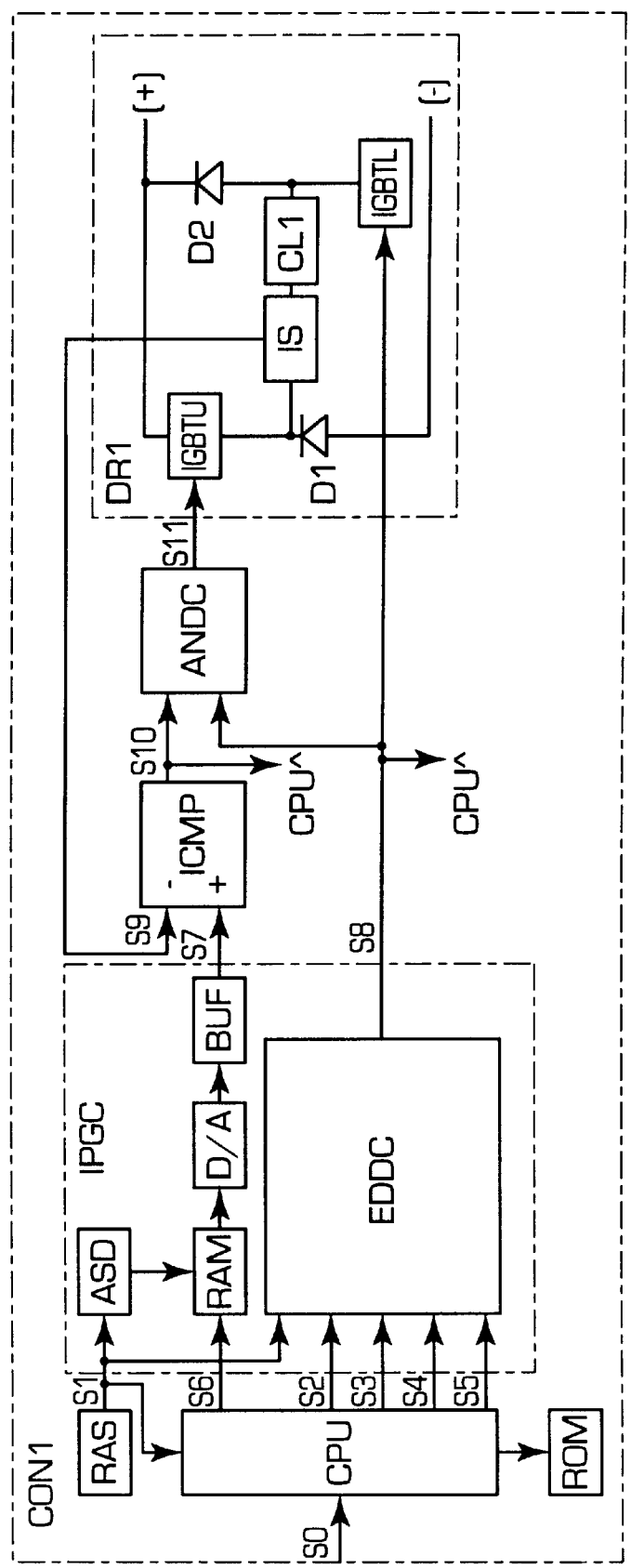
FIG. 2 is a block diagram of an energizing division for a first phase coil.

Refer next to FIG. 2 wherein a detailed structure of the first phase energizing division CON1 is depicted in a circuit diagram mode. The first phase energizing division CON1 has, as its major components, a rotor angle detecting sensor RAS, a memory ROM, a micro-processor CPU, a current wave shape generating circuit IPGC, a comparison circuit ICMP, an output decision circuit ANDC, and a single phase coil driver DR1. It is to be noted that the rotor angle detecting sensor RAS, the memory ROM, and the micro-processor CPU are shared by or common to the three energizing divisions CON1, CON2, and CON3.

The rotor angle detecting sensor RAS is used to detect an angular position of a rotor (not shown), convert such an angular position into a digital signal S1, and send the resultant signal S1 to the micro-processor CPU and both of an address decoder ASD and an energizing/de-energizing detection circuit EDDC of the electric current wave form generating circuit IPGC.

The memory ROM stores multiple sets of energization initiating angle and energization terminating angle and multiple sets of current wave forms indicating a reference current amount to be fed to the first phase coil CL1 at a specific rotor angular position so as to correspond to different sets of motor RPM and torque.

The micro-processor CPU, in response to a condition change of a main switch (not shown) from its OPEN condition to OFF condition feeds a reset pulse S2 to an energizing/de-energizing detection circuit EDDC of the electric current wave form generating circuit IPGC. The main switch is normally in the ON-condition when the vehicle is running. In addition, the micro-processor CPU checks whether or not an abnormal condition occurs and feeds the resultant signal or a binary signal S3 to the energizing/de-energizing detection circuit EDDC. If the abnormal condition is found or not found, the binary signal S3 is of high-level or low-level, respectively. It is to be noted another or similar binary signal S3 is used in each of the second phase energizing division CON2 and the third phase energizing division CON3.

When no abnormal condition is found, the micro-processor CPU calculates a target torque and a target RPM of the switched reluctance motor SRM based on a set of signals S0 from a shift lever, a brake switch, an acceleration switch, a throttle angle sensor (all are not shown) and the signal S1 from the rotor angular position sensor RAS. Then, from the memory ROM, a set of data comprised of an energizing initiating rotor angular position and a de-energizing terminating rotor angular position and a current wave shape read out which are correspond to the set of the resultant target torque and RPM of the switched reluctance motor SRM.

One of the read-out energizing initiating rotor angular position and de-energizing terminating rotor angular position is regarded, based on an arithmetic difference therebetween and a rotating direction of the rotor, as an actual energizing initiating rotor angular position and consequently the other is regarded as an actual de-energizing terminating rotor angular position. The actual energizing initiating rotor angular position and the actual de-energizing terminating rotor angular position are fed as digital signals S4 and S5, respectively, to the energizing/de-energizing detection circuit EDDC of the electric current wave form generating circuit IPGC. The read-out current wave shape is fed as a digital signal S6 to a memory RAM in the electric current wave form generating circuit IPGC.

In addition, the micro-processor CPU generates two sets of data, each comprising an energizing initiating rotor angular position, de-energizing terminating rotor angular position, and a current wave form for the second phase coil CL2 and the third phase coil CL3, respectively in such a manner that a first phase shift of the second phase coil CL2 and a second phase shift of the third phase coil CL3 are established. The first phase shift and the second phase shift depend on the number of poles of the stator of the switched reluctance motor SRM.

The current waveform which is read out by the micro-processor CPU, names reference current amount data corresponding to the rotor angular position, is fed as the digital signal S6 to the memory RAM. The memory RAM has addresses which correspond to the rotor angular position and stores the reference current amount data in the corresponding address. The rotor angular position is stored in the address decoder ASD of the current wave form generation circuit IPGC, which is fed thereto as the digital signal S1 from the rotor angular position sensor RAS. Such rotor angular position is converted into a number expressing an address number in the memory RAM. Whenever the rotor angular position detected by the rotor angular position sensor RAS changes, the current wave form generation circuit IPGC reads a reference current amount corresponding to the resultant rotor angular position from the memory RAM. The resultant reference current amount is then converted into an analogue mode by a digital/analogue converter D/A and is fed from a buffer BUF as an analogue signal S7 to the comparison circuit ICMP.

The energizing/de-energizing detection circuit EDDC of the electric current wave form generating circuit IPGC generates a binary signal S8 which indicates whether the first phase coil CL1 is energized or de-energized on the basis of the signal S1 from the rotor angular position sensor RAS and the signals S2 to S5 inclusive from the micro-processor CPU. The resultant binary signal S8 is output to both the output decision circuit ANDC and a gate dielectric type bipolar transistor IGBTL in a first phase coil driver DR1. A high level and a low level of the binary signal S8 indicate the energized (conductive) and de-energized (non-conductive) conditions, respectively, of the first phase coil CL1.

The energizing/de-energizing detection circuit EDDC of the electric current wave form generating circuit IPGC brings the binary signal S8 into its low level in response to the reset pulse signal S2 or whenever the binary signal S3 is at its low level. Under the high level condition of the binary signal S3, if the rotor angular position indicated by the signal S1 becomes the rotor angular position for excitation initiation which is indicated by the signal S4, the binary signal S8 is switched from the low level to the high level, while if the rotor angular position indicated by the signal S1 becomes the rotor angular position for de-excitation initiation which is indicated by the signal S4, the binary signal S8 is switched from the high level to the low level.

The first phase coil driver DR1 includes a transistor IGBTU and a diode D1 disposed in series between a positive terminal (+) and a negative terminal (−) of a power source. Another transistor IGBTL and a diode D2 are disposed in series between the positive terminal (+) and the negative terminal (−) of the power source. The first phase coil CL1 is connected at one end thereof to both the transistor IGBTL and the diode D2. The other end of the first phase coil CL1. is connected to one end of a current sensor IS whose other end is connected to both the transistor IGBTU and the diode D1. The current sensor IS detects a current which flows through the first phase coil CL1 and issues an analogue signal S9 to the comparison circuit ICMP.

The comparison circuit ICMP makes a comparison between the analogue signal S7 indicating the reference current which is to flow through the first phase coil CL1 and the analogue signal S9 indicating the current which actually flows through the first phase coil CL1, and issues a binary signal S10 to the output decision circuit ANDC which indicates whether or not the current actually flowing through the first phase coil CL1 is larger than the reference current. If the current actually flowing through the first phase coil CL1 is larger, the binary signal S10 is set to be low level. If not, the binary signal S10 is set to be high level.

The output decision circuit ANDC is an AND-gate for manipulating the binary signals S8 and S10 input therein and issues thereafter a binary signal S11 to the transistor IGBTU of the first phase coil driver DR1.

The transistor IGBTU of the first phase coil driver DR1 is set to be switched on and off when the binary signal S11 output from the output decision circuit ANDC is at high level and low level, respectively. Similarly, the transistor IGBTL is set to be switched on and off when the binary signal S8 is output from the detection circuit EDDC, respectively. When the binary signal S8 is at low level, both of the transistors IGBTU and IGBTL are switched off, whereby a current does not flow through the first phase coil CL1. At a high level of the binary signal S8 which indicates excitation and high level of the binary signal S10 which indicates that the current actually flowing through the first phase coil CL1 is less than the reference current, the binary signal S11 becomes high level which cause concurrent switching-on operations of the transistors IGBTU and IGBTL, respectively, whereby a current from the power source flows through the first phase coil CL1. Even though the binary signal S8 is at high level, the binary signal S11 becomes low level when the binary signal S10 is at low level which indicates that the current actually flowing through the first phase coil CL1 is less than the reference current, whereby the binary signal S11 becomes low level. This results in the transistor IGBTU being switched off while the transistor IGBTL continues to be switched on and therefore no current flows through the first phase coil CL1. Thus, under the high level condition of the binary signal S8 which is caused by switching on the transistor IGBTL, repeating the switching on and off of the transistor IGBTU, which depends on the level change of the binary signal S10, establishes a control which brings an approach of the current flowing through the first phase coil CL1 to the reference current.

The binary signals S8 and S10, which are output from the energizing/de-energizing detection circuit EDDC and the comparison circuit ICMP, respectively, are also fed to the micro-processor CPU. Similarly, two signals in the second phase energizing division CON2 which correspond to the binary signals S8 and S10, respectively, are fed to the micro-processor CPU. Two signals in the third phase energizing division CON3 which correspond to the binary signals S8 and S10, respectively, are fed to the micro-processor CPU.

The micro-processor CPU checks the binary signals S8 and S10 from the first phase energizing division CON1, the binary signals similar thereto from the second phase energizing division CON2, and the binary signals from the third phase energizing division CON3 for detecting whether or not a short-circuit occurs in each of the first phase coil CL1, the second phase coil CL2, and the third phase coil CL3. If one of the phase coils CL1, CL2 and CL3 is found to be in a short-circuit condition, the micro-processor CPU changes the binary signal S3 to low level form high level and de-energizes the first phase coil Cl1, the second phase coil CL2 and the third phase coil CL3.

Figure 3:
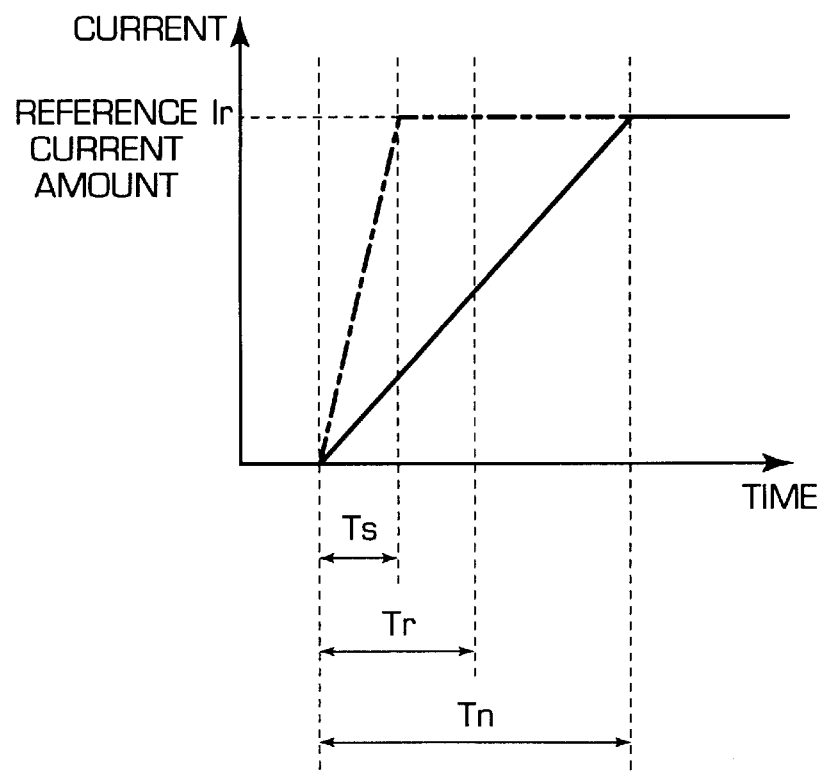
FIG. 3 is a time chart showing a relationship between a current flowing through each phase coil and time.

In detail, as shown in FIG. 3, a time duration between an initiation of energizing the first phase coil CL1 after change of the binary signal S8 from low level to high level and a time point when the binary signal S10 becomes low level, from high level or a current set-up time, defined as a required time duration for reaching the reference current Ir from zero with respect to the current detected by the current sensor IS becomes Tn and Ts (which is shorter than Tn) when a short-circuit is found and is not found, respectively, in the first phase coil CL1. The set-up times Tn and Ts vary in proportion with the reference current amount Ir. This can also be said of in each of the second phase coil CL2 and the third phase coil CL3. Thus, a procedure for detecting a short-circuit in a coil where a short-circuit in the coil changes the set-up time for energizing the coil is illustrated in the form of a flow chart as shown in FIG. 4 is executed by the micro-processor CPU.

Figure 4:
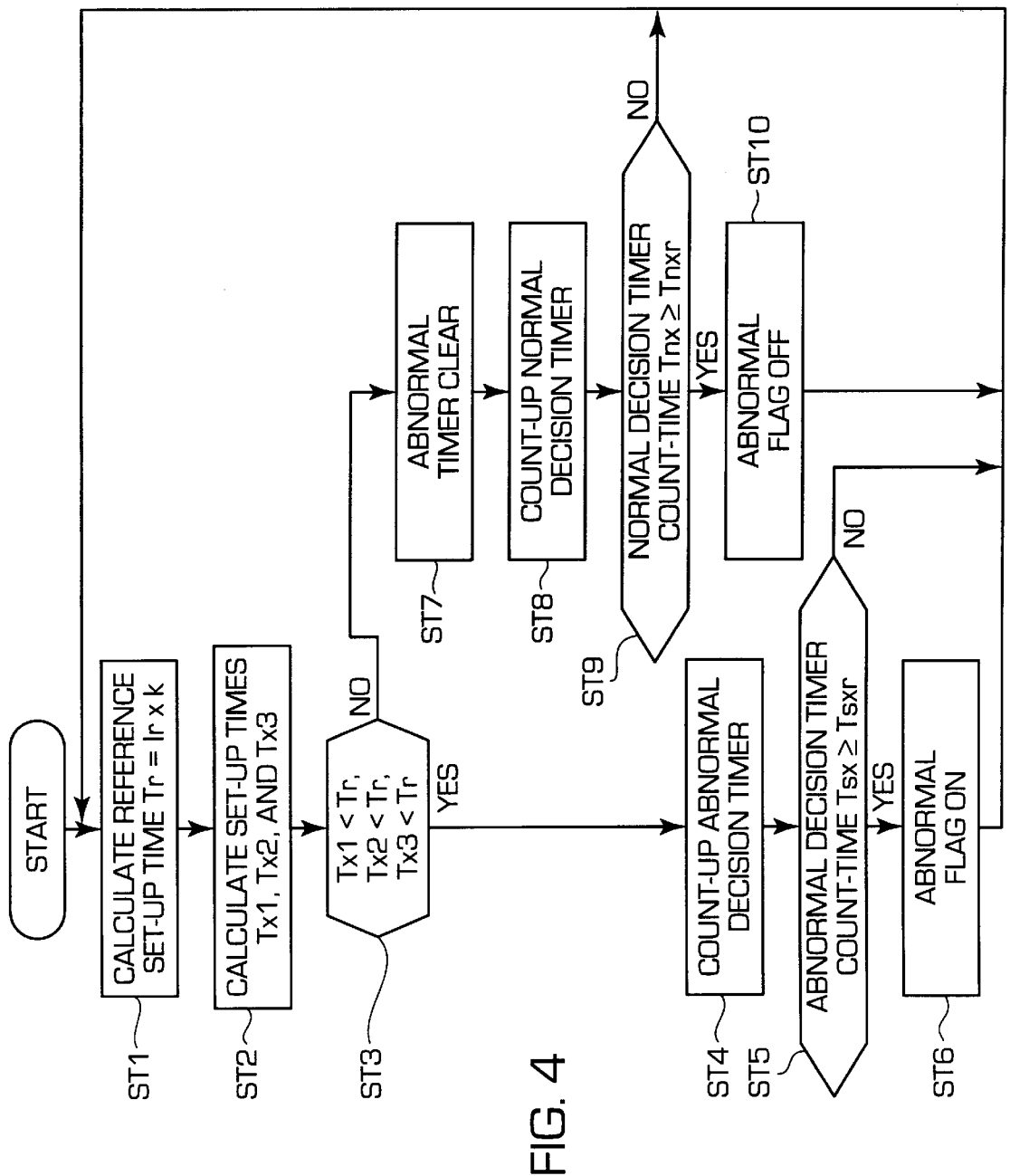
FIG. 4 is a flowchart showing how a short circuit in each phase coil is detected.
Figure 5:
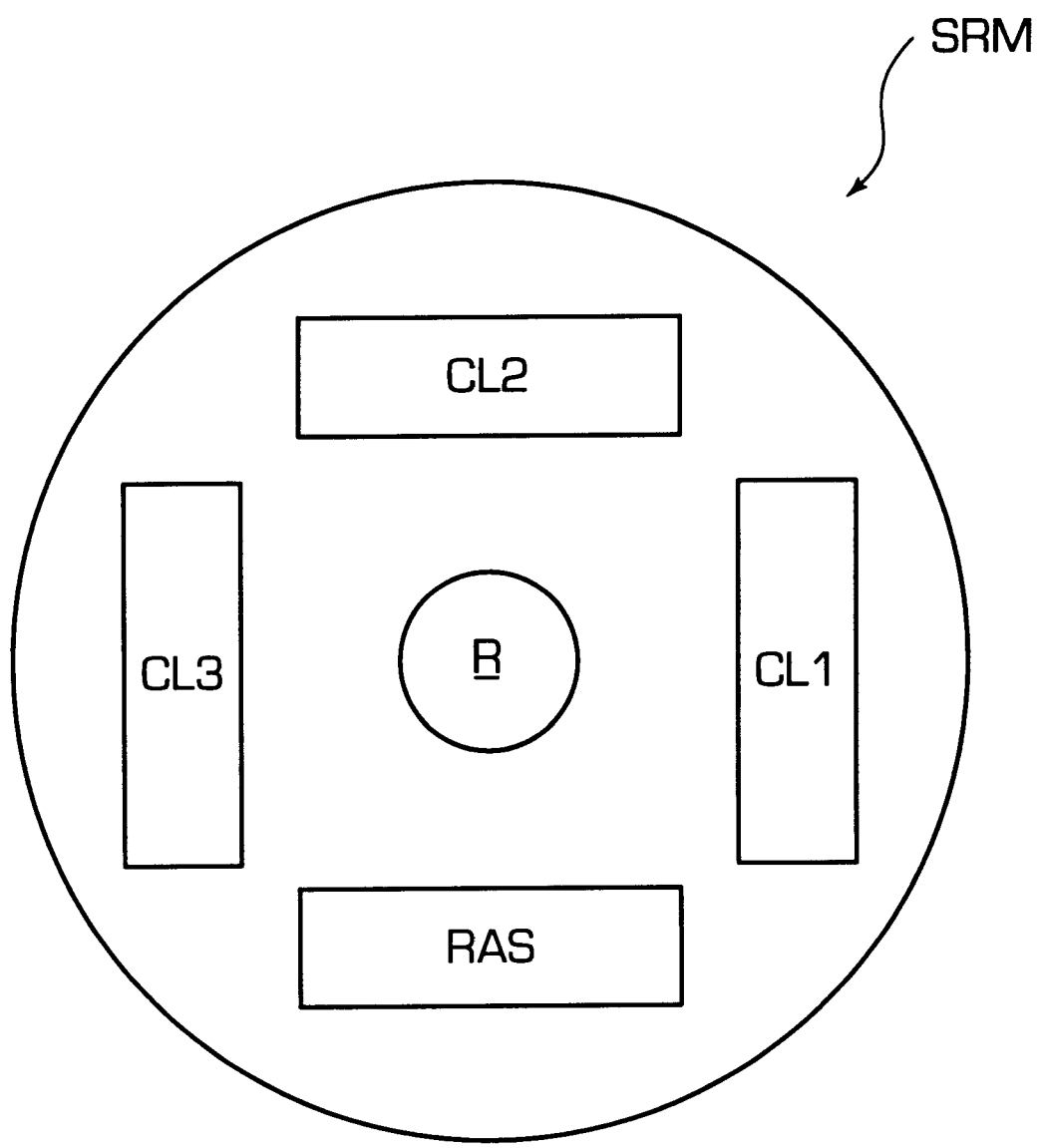
FIG. 5 is a schematic partial view of a three phase switched reluctance motor.

Referring next to FIG. 4, at step ST1, a reference set-up time Tr is calculated. The reference set-up time Tr is a product of the reference current Ir and a coefficient of, say, 0.1 and is set to be shorter than the set-up time Tn but is longer than the set-up time Ts. Next, at step ST2, a set-up time Tx1 for energizing the first phase coil CL1, a set-up time Tx2 for energizing the second phase coil CL2, and a set-up time Tx3 for energizing the third phase coil CL3 are calculated. Then, step ST3 is executed to check whether or not each of the set-up times Tx1, Tx2, and Tx3 is less than the reference set-up time Tr. If at least one of the times Tx1, Tx2, and Tx3 is found to be less than the reference time Tr, step 4 is executed to count up an abnormal decision timer. Thereafter, step ST5 is performed to check whether the counting time Tsx of the abnormal decision timer is longer than a reference value Tsxr. If the result is negative, the control is returned to step ST1. If the result positive, before the control is returns to step ST1, an abnormal flag is set to be ON at step ST6.

If the result is that each of the set-up times Tx1, Tx2, and Tx3 is not less than the reference set-up time Tr, step ST7 is executed to clear the abnormal decision timer. Consequently, step ST8 is executed to count up a normal decision timer. Thereafter, step ST9 is performed to check whether the counting time Tnx of the normal decision timer is longer than a reference value Tnxr. If the result is negative the control is returned to step ST1. If the result is positive, the control is returned to step ST1 after setting the flag OFF at step ST10.

It is to be noted that the foregoing invention can be applied to other electric motors other than the switched reluctance motor SRM.

The invention has thus been shown and described with reference to specific embodiments, however, it should be understood that the invention is in no way limited to the details of the illustrated structures but changes and modifications may be made without departing from the scope of the appended claims.

What is claimed is:

1. An apparatus for detecting a coil short-circuit in an electric motor comprising:
   a rotor angular position detecting sensor for detecting an angular position of a rotor;
   a plurality of phase coils provided on a stator;
   a plurality of current sensors which sense currents flowing in the respective phase coils;
   an energizing controller calculating an energizing initiating rotor angle, a de-energizing terminating rotor angle, and a reference current amount for each of the phase coils on the basis of a target revolutions per minute (RPM) and torque of the motor, the energizing controller initiating an energization of each of the phase coils when the angular position of the rotor which is detected by the rotor angular position sensor is found to be in coincidence with a respective energizing terminating rotor angle for each phase coil, the energizing controller terminating the energization of each of the phase coils when the angular position of the rotor which is detected by the rotor angular position sensor is found to be in coincidence with a respective de-energizing initiating rotor angle for each phase coil, the energizing controller making a comparison between the current amount sensed by each of the current sensors and the reference current amount during a time duration between the initiation and the termination of the energization of the phase coil, for continuing and interrupting the energization of the phase coil if the sensed current amount is less and not less, respectively, than the reference current amount;

set-up time measuring means for counting a set-up time duration which ranges from a time point at which the sensed current amount is zero to another time point at which the sensed current amount reaches the reference current amount;

calculating means for calculating a references set-up time duration, based on the reference current amount;

decision means for deciding whether or not a short-circuit occurs in each of the phase coils based on a comparison between the set-up time duration measured by the set-up time measuring means and the reference set-up time duration.

2. An apparatus as set forth in claim 1, wherein the electric motor is a switched reluctance motor.

3. The apparatus of claim 1, wherein the current, whose amount is sensed by at least one of the plurality of current sensors, flows through each of the plurality of phase coils of the electric motor, said apparatus further comprising:

means for determining the reference set-up time duration, checking whether or not the amount of the sensed current reaches a set current amount before expiration of the reference set-up time duration, indicating an abnormal condition, and terminating operation of the electric motor if a duration of such abnormal condition continuation exceeds a set time.

4. The apparatus of claim 3, wherein while determining the reference set-up time duration, the current increases from zero to the set current amount.

\* \* \* \* \*